(12) United States Patent
Ganguin et al.

(10) Patent No.: US 11,960,246 B2
(45) Date of Patent: Apr. 16, 2024

(54) GEOMETRIC INSPECTION DEVICE FOR HOROLOGICAL MOBILE COMPONENTS

(71) Applicant: ETA SA Manufacture Horlogere Suisse, Grenchen (CH)

(72) Inventors: Fabrice Ganguin, Moutier (CH); Erich Welz, Courrendlin (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 747 days.

(21) Appl. No.: 17/259,375

(22) PCT Filed: Dec. 16, 2019

(86) PCT No.: PCT/EP2019/085346
§ 371 (c)(1),
(2) Date: Jan. 11, 2021

(87) PCT Pub. No.: WO2020/127046
PCT Pub. Date: Jun. 25, 2020

(65) Prior Publication Data
US 2021/0271206 A1   Sep. 2, 2021

(30) Foreign Application Priority Data

Dec. 18, 2018 (EP) .................................... 18213554

(51) Int. Cl.
*G04D 7/00* (2006.01)
*G01B 7/31* (2006.01)
(Continued)

(52) U.S. Cl.
CPC ............... *G04D 7/003* (2013.01); *G01B 7/31* (2013.01); *G04B 31/00* (2013.01); *G04D 1/00* (2013.01)

(58) Field of Classification Search
CPC .......... G04D 7/002; G04D 7/00; G04D 7/001; G04D 7/1207; G04D 7/1214; G04D 7/003;
(Continued)

(56) References Cited

U.S. PATENT DOCUMENTS

| 4,297,926 A * | 11/1981 | Russ | ......................... | B24B 5/42 |
| | | | | 451/249 |
| 4,628,575 A * | 12/1986 | Klufas | ..................... | G01B 7/31 |
| | | | | 228/103 |

(Continued)

FOREIGN PATENT DOCUMENTS

| CH | 343742 A | 12/1959 |
| CH | 709 006 A2 | 6/2015 |

(Continued)

OTHER PUBLICATIONS

International Search Report dated Feb. 14, 2020 in PCT/EP2019/085346 filed on Dec. 16, 2019, 2 pages.

(Continued)

*Primary Examiner* — Octavia Davis Hollington
(74) *Attorney, Agent, or Firm* — Oblon, McClelland, Maier & Neustadt, L.L.P.

(57) ABSTRACT

A geometric inspection device for horological mobile components, including a headstock bearing a first spindle defining a first axis of rotation and a tailstock defining a second axis of rotation, on a common sole relative to which the headstock or the tailstock can move along a common direction parallel with the first axis of rotation. The device includes interchangeable micro-centering devices, at least one of the first spindle and the second spindle includes receiving means arranged to coaxially house a removable centering device, and at least one of the headstock and the tail stock includes pulling means arranged to pull without contact a micro-centering device axially along a common (Continued)

direction, opposite a space separating the headstock and the tailstock.

21 Claims, 9 Drawing Sheets

(51) Int. Cl.
  *G04B 31/00* (2006.01)
  *G04D 1/00* (2006.01)
(58) Field of Classification Search
  CPC .... G04D 1/00; G04F 1/00; G04F 3/00; G04F 5/00; G01N 35/00693; G01N 33/007; G01N 35/00594; G01N 33/0006; G01B 7/31; G04B 31/00
  See application file for complete search history.

(56) References Cited

U.S. PATENT DOCUMENTS

| | | | |
|---|---|---|---|
| 9,919,354 B2 * | 3/2018 | Everritt | B21F 27/18 |
| 2018/0136608 A1 | 5/2018 | Rochat et al. | |

FOREIGN PATENT DOCUMENTS

| | | | | |
|---|---|---|---|---|
| CH | 711 220 A2 | 12/2016 | | |
| CN | 1553291 A | 12/2004 | | |
| CN | 104133362 A | 11/2014 | | |
| CN | 104729405 A | 6/2015 | | |
| CN | 106257075 A | 12/2016 | | |
| CN | 107402511 A | 11/2017 | | |
| DE | 116 943 | 12/1975 | | |
| DE | 19705240 A1 * | 9/1998 | ............. | B23B 41/02 |
| DE | 10308342 A1 * | 9/2004 | ............. | B23B 3/161 |
| EP | 2481521 A1 * | 8/2012 | ............. | B23B 25/06 |
| EP | 2 887 007 A1 | 6/2015 | | |
| EP | 3 081 997 A1 | 10/2016 | | |
| EP | 2887007 | * | 8/2017 | |
| JP | 2012141548 A * | 7/2012 | | |
| JP | WO2015079836 A1 * | 3/2017 | | |
| JP | 2018051665 A * | 4/2018 | | |

OTHER PUBLICATIONS

Combined Chinese Office Action and Search Report dated Feb. 8, 2022 in Patent Application No. 2019800540585 (with English language translation and English translation of Category of Cited Documents), 13 pages.

* cited by examiner

GEOMETRIC INSPECTION DEVICE FOR HOROLOGICAL MOBILE COMPONENTS

FIELD OF THE INVENTION

The invention relates to a geometric inspection device for horological mobile components, including a headstock bearing a first loose or motorized spindle and defining a first axis of rotation and a tailstock bearing a second loose or motorized spindle defining a second axis of rotation, arranged on a common sole relative to which at least said headstock and/or said tailstock can move according to at least one degree of freedom in translation along alignment guiding means along a common direction parallel with said first axis of rotation, and means arranged to ensure or set the coaxiality of said second axis of rotation relative to said first axis of rotation.

The invention relates to the field of metrological tools, and more specifically the field of in-process inspection tools, for the specific case of the dimensional and geometric inspection of horological mobile components.

BACKGROUND OF THE INVENTION

The dimensional and geometric inspection of horological components is difficult to carry out, due to the very small sizes of the components, and extremely low tolerances, frequently of an amplitude markedly less than the resolution of the usual multipurpose measuring means, such as three-dimensional measurement centers or similar. For this reason, in-process inspections frequently require sampling and passage in an inspection room or laboratory, for a time-consuming and costly verification, or indeed dedicated, non-multipurpose, and very costly tools.

The gripping of mobile components is particularly delicate, as, due to the small diameter thereof, the arbor-set parts that cannot include, as in general mechanics, internal centers for bench inspections between points, and the external shoulders are frequently too short to provide satisfactory guidance in rotation. For this reason, the inspection of such mobile components is frequently performed on V-blocks, which restricts the inspection to a spatially horizontal position, which is not generally representative of operating positions; furthermore, the height setting of the V-blocks is frequently difficult to carry out properly. Already difficult to carry out properly in static mode, inspection is complicated further when it is necessary to rotate the mobile component for a dynamic inspection, or, quite simply, to measure a warp, an area out of truth with the flat or other. Airflow drive is not adapted to all mobile component geometries, and known bow and bearing wire drive mechanisms are inconvenient to use, due to problems in respect of non-reproducibility of the wire tension, the inclination thereof, the aging thereof with detent of the twist thereof, the wear thereof ranging up to rupture, the pollution carried by the wire, to only mention the main drawbacks.

Known equipment is not multipurpose, and therefore unsuited to a varied production context with the manufacture of numerous references.

The two-fold problem of holding and rotating horological mobile components less than 4 millimeters in length, with arbor-set parts close to one-tenth of a millimeter in diameter, therefore remains unresolved, and the inspection thereof remains a difficult and costly operation.

SUMMARY OF THE INVENTION

The invention proposes to provide an industrial solution to this two-fold problem, and to define a mechanism that is easy to use, interchangeable and adapted to a change in production rendering the inspection of a new product easy, while remaining economical, both in terms of material investment and inspection time, and ensuring the required accuracy, and reproducibility of the measurements.

To this end, the invention relates to a geometric inspection device for horological mobile components according to claim 1.

BRIEF DESCRIPTION OF THE DRAWINGS

Further features and advantages of the invention will emerge on reading the following detailed description, with reference to the appended drawings, wherein:

FIG. 1 represents, schematically, and in a perspective view, a device according to the invention, in a compact alternative embodiment, which forms a standard support, herein represented in a non-limiting embodiment with a headstock fixedly mounted on a sole, and bearing a spindle wherein an interchangeable removable centering device is inserted; on the same sole, a column guidance guides a tailstock in the alignment of the headstock, they delimit together an air-gap, wherein a mobile component to be inspected will be inserted; this tailstock is equipped in the same way as the headstock, with a spindle wherein a further interchangeable removable centering device is inserted; a micrometer enables fine setting of the axial position of the tailstock relative to the headstock; this alternative embodiment is motorized, and includes drive means for rotating the headstock spindle;

FIG. 4 is a detail of the central part of FIG. 3, and shows the arrangement of each interchangeable removable centering device in a specific, non-limiting alternative embodiment, where an external tubular part includes a cylindrical outer surface, which cooperates as tightly as possible with a hole included in the corresponding spindle; this tubular part surrounds a ferromagnetic or magnetic polar core, which bears, on the side opposite the air-gap, on a magnet borne by the headstock or the tailstock, or indeed which comes in the immediate vicinity of such a magnet, this polar core being arranged to channel the magnetic field lines in the vicinity of the common axis; the tubular part bears herein, non-restrictively, a gripper on the air-gap side; the drive motor drives the headstock spindle indirectly, via a cardan joint assembly, or a carrier, or any similar work-driver;

FIGS. 5 to 9 illustrate various advantageous combinations of removable centering devices according to the invention:

the top section of FIG. 12 represents a centering device with a gripper bearing on the internal polar mass which in turn bears on the magnet of the headstock or tailstock;

in the bottom section of FIG. 12, a non-magnetic bearing mass, typically made of ruby or similar, precedes a ferromagnetic or magnetic intermediate polar mass, bearing on the polar core, and channeling the field or strengthening the axial field when this intermediate polar mass is magnetic;

DETAILED DESCRIPTION OF PREFERRED EMBODIMENTS

The invention proposes to define an inspection mechanism that is easy to use, interchangeable and adapted to a change in production rendering the inspection of a new product easy, while remaining economical, both in terms of material investment and inspection time, and ensuring the required accuracy, and reproducibility of the measurements.

Figure 1:
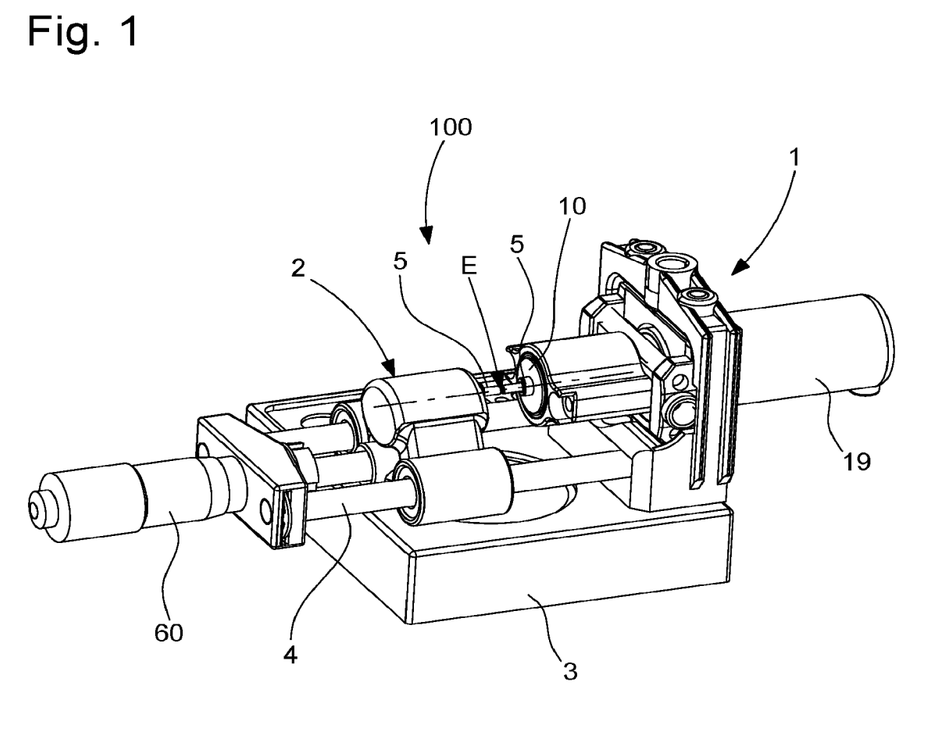
Figure 2:
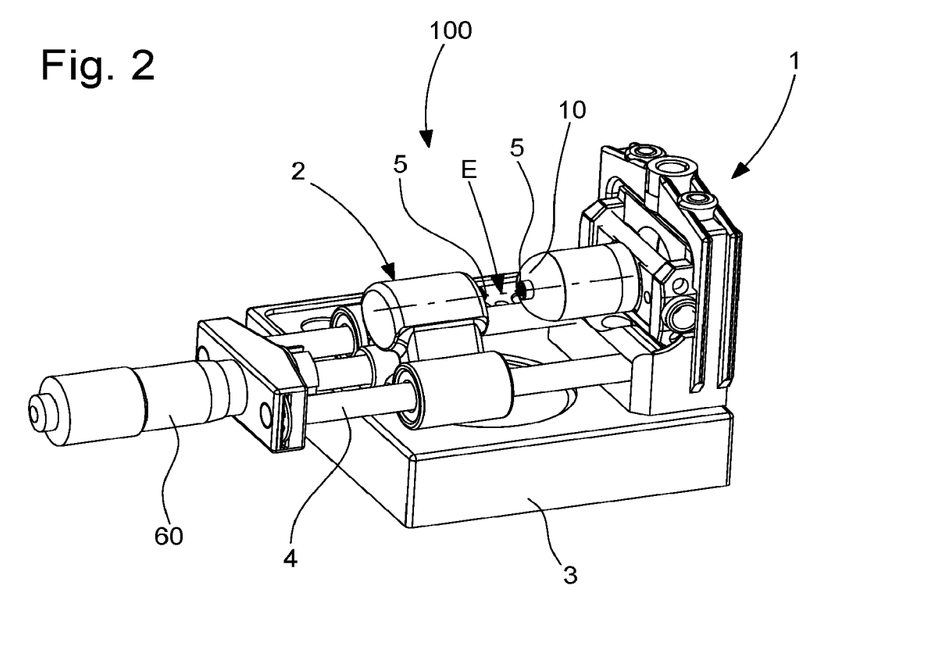
FIG. 2 represents, in a similar manner to FIG. 1, a non-motorized alternative embodiment, devoid of the drive means of FIG. 1.

To this end, the invention relates to a geometric inspection device 100 for horological mobile components. As seen particularly in FIGS. 1 and 2, this device 100 includes a headstock 1 bearing a first loose or motorized rotatable spindle 10, and with a first hole 101 and defining a first axis of rotation D1, and tailstock 2 bearing a second loose or motorized spindle 20 and defining a second axis of rotation D2, arranged on a common sole 3 relative to which at least the headstock 1 and/or the tailstock 2 can move according to at least one degree of freedom in translation along alignment guiding means 4 along a common direction D parallel with the first axis of rotation D1. For example, as illustrated, the headstock 1 is fixed, and the tailstock 2 can move along guiding columns forming these alignment guiding means 4.

The device 100 includes means arranged to ensure or set the coaxiality of the second axis of rotation D2 relative to the first axis of rotation D1. In the case of the figures, the alignment guiding means 4 ensure this coaxiality, and the lateral position of the tailstock 2 is not adjustable. In an alternative embodiment not illustrated, the tailstock 2 can be loaded on a transverse carriage, along an orthogonal direction to the first axis of rotation D1, and include micrometric lateral adjustment means.

According to the invention, the device 100 includes a plurality of interchangeable removable centering devices 5, and at least the first spindle 10 and/or the second spindle 20 includes receiving means 30, which are arranged to coaxially house such a removable centering device 5.

And at least the headstock 1 and/or the tailstock 2 includes pulling means 40, which are arranged to pull without contact such a removable centering device 5 axially along the common direction D, opposite to an air-gap 90 separating the headstock 1 and the tailstock 2. More specifically, and as illustrated in the figures, both the first spindle 10 and the second spindle 20 include such receiving means 30, and both the headstock 1 and the tailstock 2 include pulling means 40.

In a simple, precise, and economical alternative embodiment, the receiving means 30 include holes, and can include an axial abutment bearing surface.

Particularly the second spindle 20 includes a second hole 102 of the same diameter as the first hole 101, and the device 100 includes a plurality of removable and interchangeable micro-centering devices 5, each arranged to be inserted indifferently in the first hole 101 or the second hole 102, and each including a peripheral shoulder 590 of diameter arranged for the tight sliding fit thereof with the first hole 101 or the second hole 102. Each micro-centering device 5 includes a ferromagnetic or magnetic polar core 42, arranged to cooperate in attraction with a magnetic pole 41 included in the headstock 1 and/or the tailstock 2, and which defines a magnetic field of revolution about the first axis of rotation D1 in a space 90 separating the headstock 1 and the tailstock 2, or being formed of a polar core 42.

The invention is described herein in the simplest version thereof with a single headstock 1 and a single tailstock 2, but it is understood that the device can include more tailstocks arranged to cooperate with the same headstock 1. However, the design of the invention with such interchangeable removable centering devices 5 is so simple and easy to use that the change of equipment of the inspection device 100 is very quick, and the configuration illustrated proves to be sufficient.

More specifically, the pulling means 40 include at least one magnetic pole 41, particularly at least one magnet, which is arranged to attract a ferromagnetic or magnetic polar core 42 included in each removable centering device 5, to a rear abutment position on an abutment bearing surface, which can be a surface of the magnetic pole 41, or indeed of partition through which can circulate, substantially axially, the magnetic field emitted by this magnetic pole 41. The invention is illustrated in the figures with permanent magnets, such a magnetic pole 41 can naturally also include at least one electromagnet.

Figure 3:
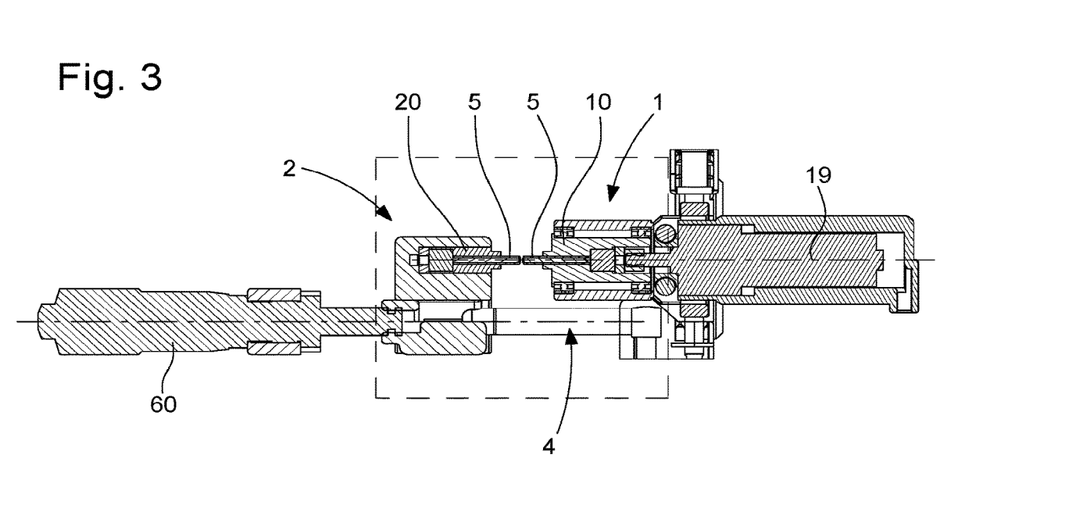
FIG. 3 represents, schematically, and in a cross-section through the common axis of the headstock and the tailstock when they are properly aligned, the device of FIG. 2, in a position wherein the headstock and the tailstock are in a closer position, before the separation thereof for the presentation and insertion of a mobile components to be inspected.
Figure 4:
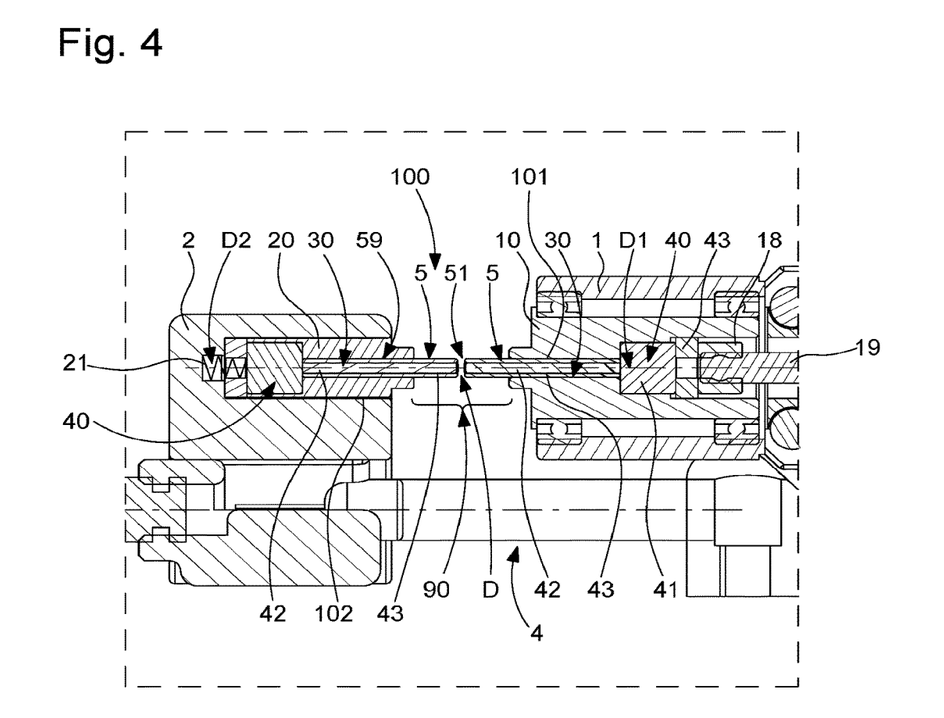

FIGS. 3 and 4 show the axial arrangement of these magnets 41, which can be reinforced with secondary magnets 430, as seen on the headstock 1, to reinforce the magnetic field.

Figures 13, 14, 15:
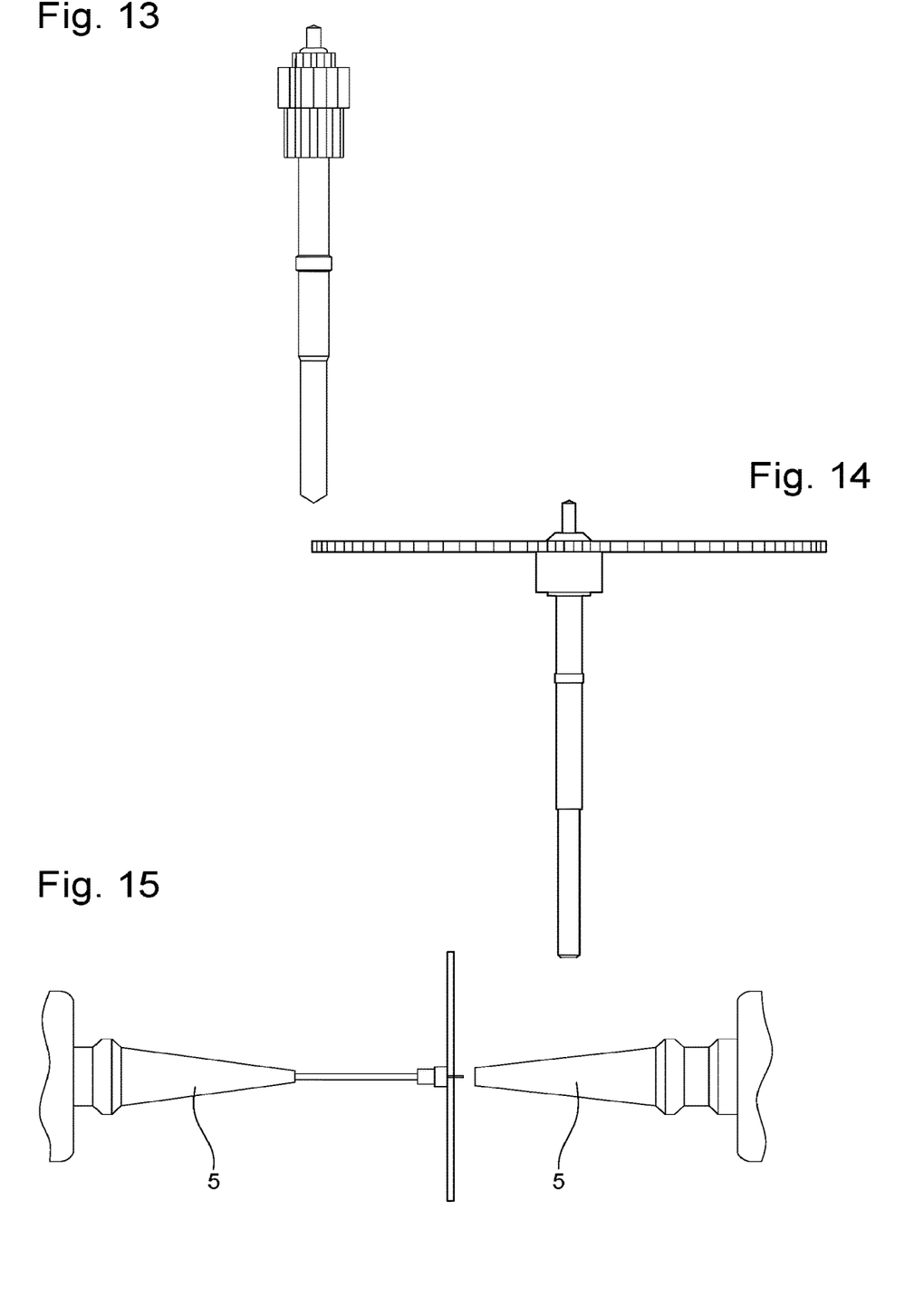
FIG. 13 represents, schematically and in elevation, a mobile component whereon dimensional inspections are to be performed, semi-statically, for example the length of the cut part, and the diameters of different shoulders; it is seen that the proximity of the cut part with one of the ends renders gripping difficult with conventional means.
FIG. 14 represents, schematically and in elevation, a further mobile component whereon geometric inspections are to be performed, in this instance dynamic backlash inspections, for example the simple backlash of the external diameter of the toothed wheel relative to the two end shoulders on either side of the toothed wheel, and the simple backlash of one of the faces of the toothed wheel relative to these two same shoulders; here also, the proximity of the large wheel with one of the ends renders the gripping thereof difficult with conventional means.
FIG. 15 illustrates the gripping of the mobile component of FIG. 14 with the device according to the invention, wherein the centering devices are cleared on the front part thereof, to better guide the magnetic flux toward the axis of the mobile component, for an inspection with rotation of the headstock.
Figure 16:
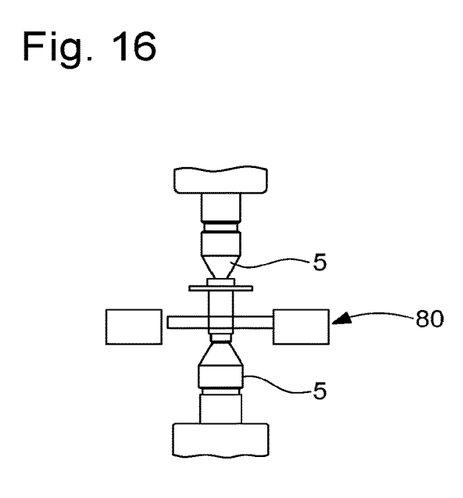
FIG. 16 illustrates the gripping of a further mobile component, held with micro-points, facing viewing means, particularly a camera, included in the device according to the invention; the rectangles close to the greater diameter illustrate an example of a viewing zone by a camera, as in FIG. 17 hereinafter; the narrow rectangles perpendicular to the axis illustrate further examples of optical monitoring zones, particularly to check the absence of runout, as in the following FIGS. 17 and 18.
Figure 17:
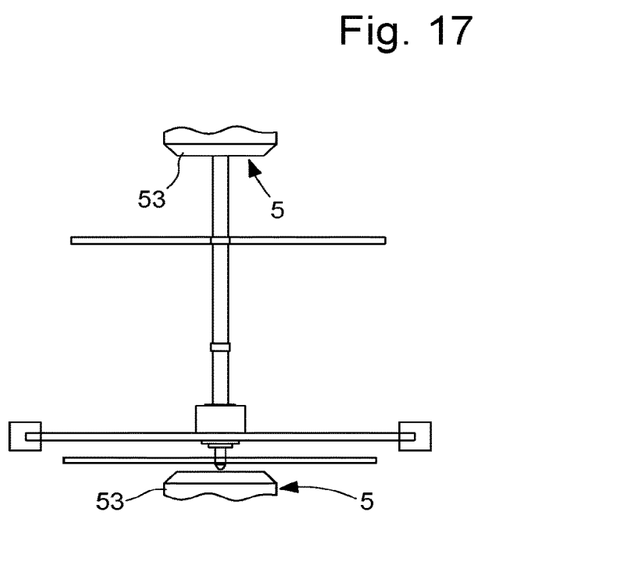
FIG. 17 illustrates the gripping of a further mobile component, between a centering ruby opposite a flat ruby, facing this camera, for an inspection with rotation of the headstock.
Figure 18:
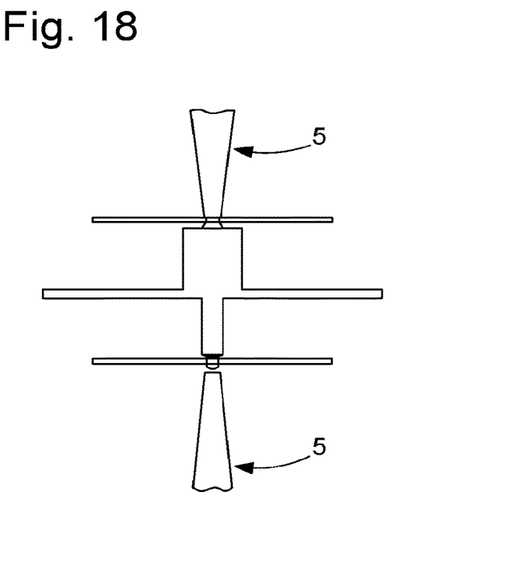
FIG. 18 illustrates the gripping of a further mobile component, held by two conical internal toothings, facing this camera, for an inspection with rotation of the headstock.
Figure 19:
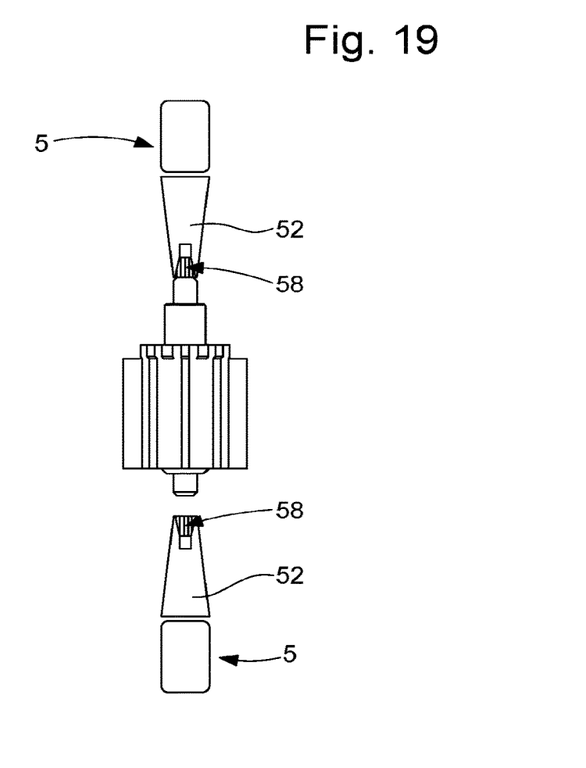
FIG. 19 illustrates the particularly difficult case of gripping of an average pinion, held by two conical internal toothings, facing this camera, for an inspection with rotation of the headstock.

The important aspect is channeling the magnetic field in the vicinity of the common axis D. To this end, the removable centering devices 5 are arranged to at least guide the magnetic flux along this direction, or even move same closer to the geometric axis D, as seen in FIG. 15, or even reinforce the field with the serial arrangement of a ferromagnetic or magnetic polar mass 52, as will be seen hereinafter.

Thus, specifically, at least one removable centering device 5 includes means for concentrating an axial magnetic field, to which it is subjected at a first axial end opposite the space 90 and/or generated by this at least one removable centering device 5, about the common direction D, at a second end oriented toward the space 90. FIG. 15 thus illustrates the gripping of a mobile component, with centering devices 5 cleared on the front part thereof, to better guide the magnetic flux toward the axis D of the mobile component, for an inspection with rotation of the headstock 1. Document EP28887007B1 held by MONTRES BREGUET SA describes a support with such a flow concentrator.

Specifically, at least one micro-centering device 5 forms a cartouche which includes a tubular body 43 wherein the external diameter is arranged for the tight sliding fit thereof with the first hole 101 or the second hole 102, this tubular body 43 containing a ferromagnetic or magnetic polar core 42.

Naturally, if the device 100 according to the invention is advantageously designed for gripping ferromagnetic or similar components, it is also capable of handling the case of non-magnetic materials. Also, more specifically, at least one removable centering device 5 includes, on the side of the space 90, a gripper 51, which is arranged to cooperate by mechanical contact with an axial end of a horological mobile component. This mechanical contact can replace the magnetic interaction or complement same. More specifically, such a gripper 51 is arranged to rotate an axial end of a horological mobile component, when the removable centering device 5 is subjected to a rotation which is imparted thereon by the headstock 1 or the tailstock 2.

More specifically, as seen in FIGS. 7, 8, 10, 12, 19, the gripper 51 includes a conical bearing toothing 58, male or female, arranged to cooperate with an axial end of a horological mobile component for rotating this mobile component. Thus, when the mobile component to be inspected is non-magnetic, this conical toothing 58 holds, centers, and drives this mobile component.

The gripper 51 can be made of different materials, particularly and non-restrictively, hardening steel, stainless steel, sintered material such as tungsten carbide, or other. Advantageously, this gripper 51 includes, at the level of the surface thereof for driving a mobile component, a constant roughness, between 2 micrometers Ra and 5 micrometers Ra, for a satisfactory frictional drive of this mobile component.

For some applications, the gripper 51 can also include a simple male or female, smooth cone.

In a specific embodiment, at least one removable centering device 5 includes, on the side of the space 90, a ferromagnetic or magnetic polar mass 52, which is arranged to cooperate in magnetic attraction or repulsion with a magnetic or ferromagnetic axial end of a horological mobile component. More specifically, this polar mass 52 is arranged to exert or to transmit to a magnetic or ferromagnetic axial end of a horological mobile component a rotational drive torque.

Figure 5:
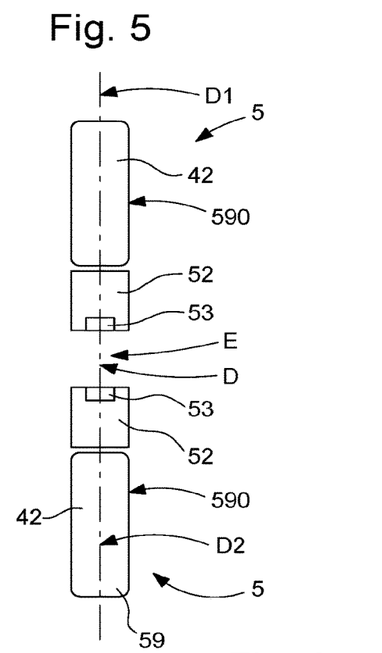
FIG. 5 includes, on the air-gap side, on both the headstock and tailstock side, a flat ruby bearing mass, behind which a ferromagnetic or magnetic polar mass holds the mobile component in magnetic levitation, perfectly in the axis.
Figure 6:
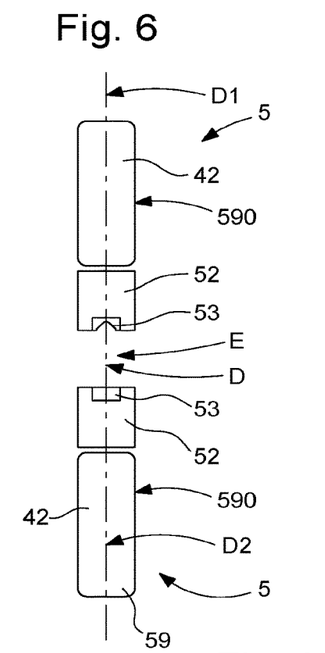
FIG. 6, next to FIG. 5, includes, on the headstock side a ruby which includes female cone centering, while the microcentering device of the tailstock is a flat ruby.
Figure 7:
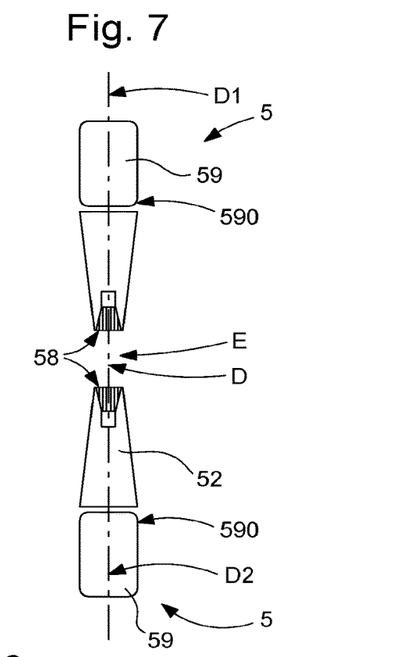
FIG. 7 includes, on the air-gap side, on both the headstock and tailstock side, a gripper including a female bearing cone with a female conical toothing, for mechanical gripping of the ends of a mobile component; herein also these microcentering devices are represented with a ferromagnetic or magnetic polar mass which can also, alone, hold the mobile component in magnetic levitation, perfectly in the axis.
Figure 8:
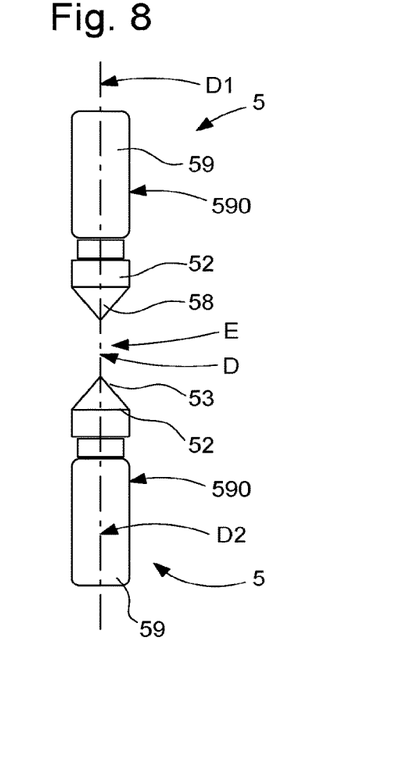
FIG. 8 is the reverse of FIG. 7, the two grippers include herein a male conical toothing.
Figure 9:
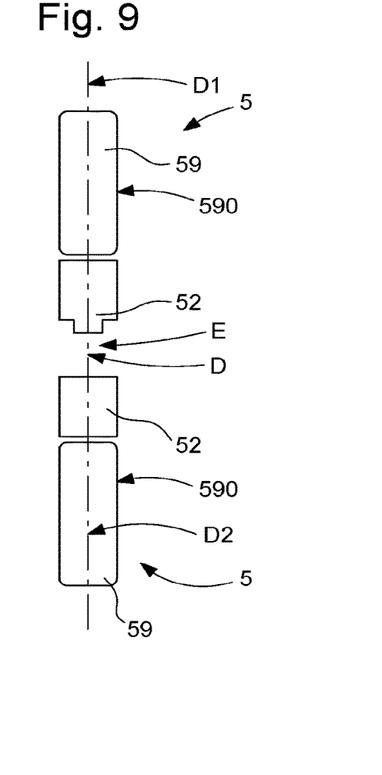
FIG. 9 shows a configuration adapted to a specific shape of mobile component to be measured, with different diameters on the headstock and tailstock side.
Figure 10:
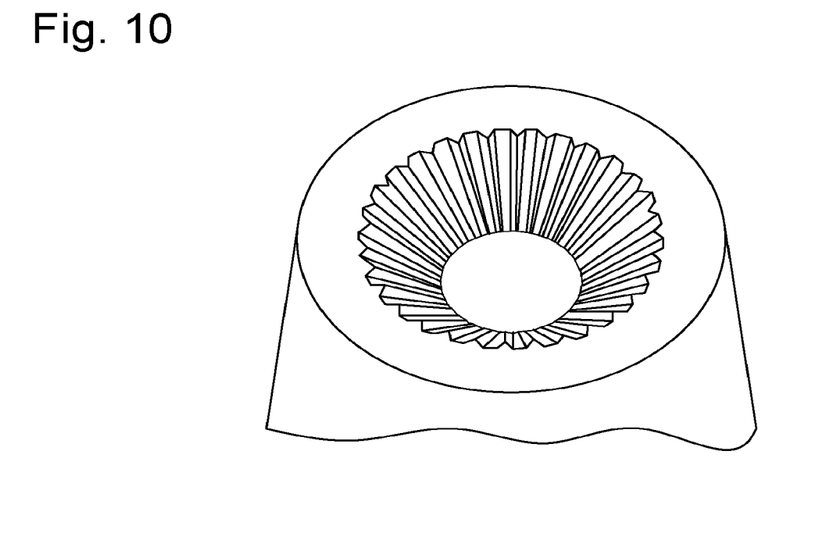
FIG. 10 is a detailed view of a female conical toothing illustrated in FIG. 7.
Figure 11:
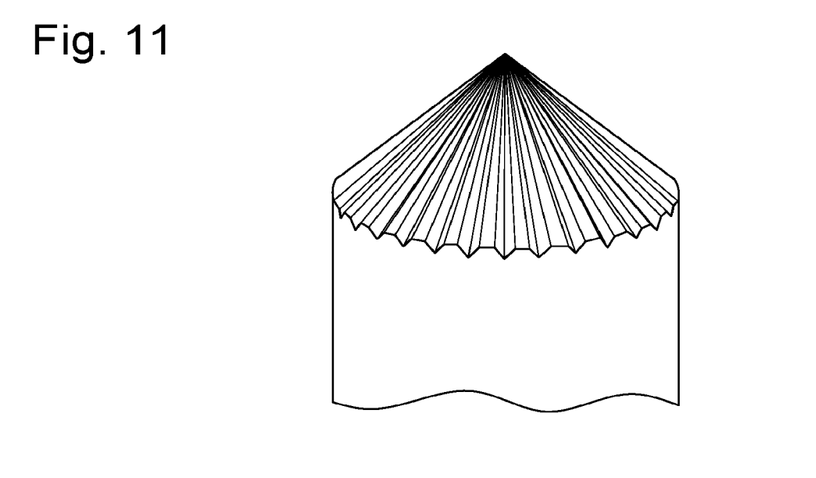
FIG. 11 is a detailed view of a female conical toothing illustrated in FIG. 8.
Figure 12:
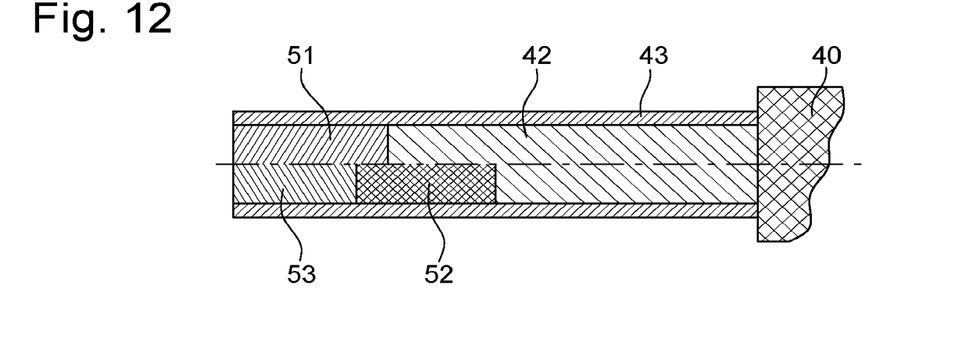
FIG. 12 is a double cross-sectional view of two non-limiting alternative embodiments of centering devices; the outer tubular shell, of constant calibrated diameter from one centering device to another, ensures interchangeability with the headstock and tailstock, wherein the spindles include the same hole.

In a further specific embodiment, at least one removable centering device 5 which includes such a ferromagnetic or magnetic polar mass 52 further includes, on the side of the space 90, a bearing mass 53, which is arranged to limit the axial travel of a horological mobile component. FIG. 5 includes, on the air-gap 90 side, on both the headstock 1 and tailstock 2 side, such a flat ruby bearing mass 53, behind which a ferromagnetic or magnetic polar mass 52 holds the mobile component in magnetic levitation, perfectly in the axis. Magnetic pivoting of a mobile component is disclosed in the document EP2450758B1 held by MONTRES BREGUET SA. More specifically, the bearing mass 53 is made of ruby or similar.

In a specific embodiment, the tailstock 2 includes an elastic return means 21, which is arranged to push back toward the space 90 the second spindle 20, or a removable centering device 5 borne by the second spindle 20. In particular, this elastic return means 21 tending to push the tailstock 20 toward the headstock 10 and to damp the recoil of the tailstock, is a spring or similar, calibrated particularly and non-restrictively at 0.2 N.

More specifically, at least the headstock 1 includes first motorization means 19, which are arranged to rotate the first spindle 10 around the first axis of rotation D1, and includes, between the first motorization means 19 and the first spindle 10, first coupling means 18 of cardan joint or similar type, to ensure unrestricted rotation of the first spindle 10, and to avoid any motor alignment fault. As seen in FIG. 4, the first spindle 10 of the headstock 1 is driven by means of the magnet 41 thereof, the drive is therefore indirect, with the advantage that the backlash or motor alignment error does not impact the rotation of the spindle.

In a specific embodiment not illustrated, at least the tailstock 2 includes second motorization means 17, which are arranged to rotate the second spindle 20 around the second axis of rotation D2, and includes, between the second motorization means 17 and the second spindle 20, second coupling means 16 of cardan joint or similar type, to ensure unrestricted rotation of the second spindle 20.

More specifically, as seen in FIGS. 1, 2, 3, and 22, the device 100 includes micrometric setting and/or measurement means 60 of the relative position of the tailstock 2 relative to the headstock 1 along the common direction D.

In a specific embodiment not illustrated, the device 100 includes lateral setting means 70 of the position of the second axis of rotation D2 relative to the first axis of rotation D1.

More specifically, the bodies of the headstock 1, the first spindle 10, the tailstock 2 and the second spindle 20 are made of non-magnetic material, such as brass, particularly rhodium-plated brass, or similar, so as not to scatter the magnetic flux away from the common direction D.

In a specific embodiment not illustrated, the headstock 1 and/or the tailstock 2 includes at least one stress gauge for measuring the axial force along the common direction D, or for comparison to a set-point value.

Figure 24:
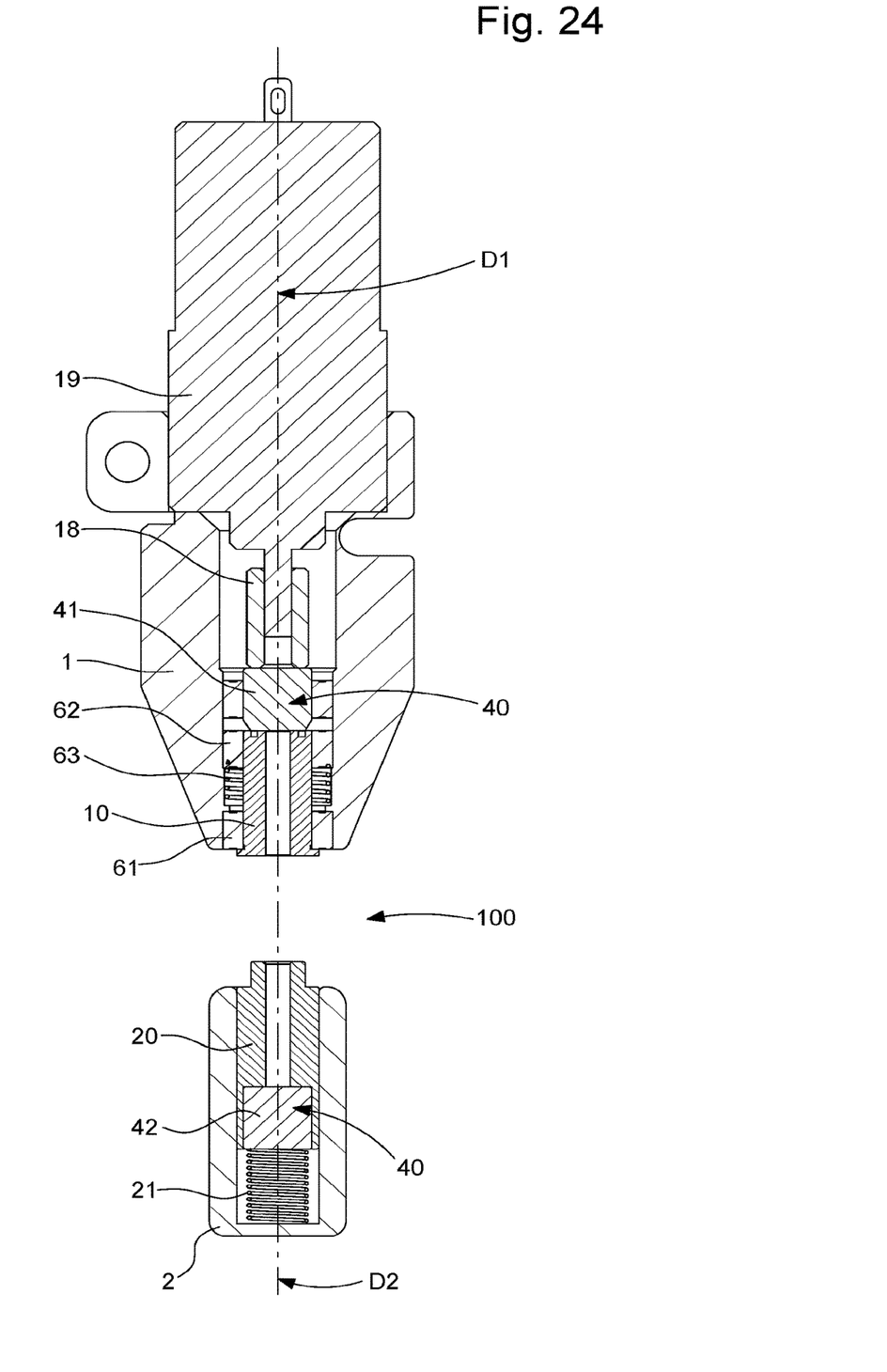
FIG. 24 represents, in a similar manner to FIG. 4, a further alternative embodiment of the invention.

FIG. 24 illustrates an alternative embodiment wherein the headstock 1 includes two guide bearings 61 and 62, between which a spring 63 arranged to compensate for the axial and radial play of these bearings is arranged. The tailstock 2 includes a spring 21 placed at the rear of the second polar mass 42, and which enables damping at the level of this tailstock.

Figure 20:
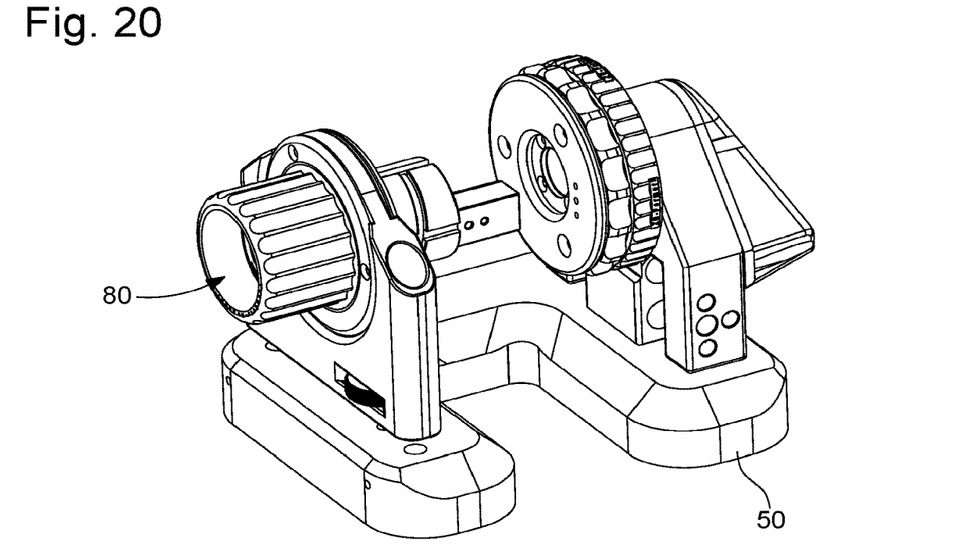
FIG. 20 represents, schematically, and in a perspective view, a device according to the invention, including a frame bearing a rotary plate arranged to receive the mechanism of FIG. 1 or 2, or to form the support base thereof, and facing which a further structural element supports a camera and the setting means thereof.
Figure 21:
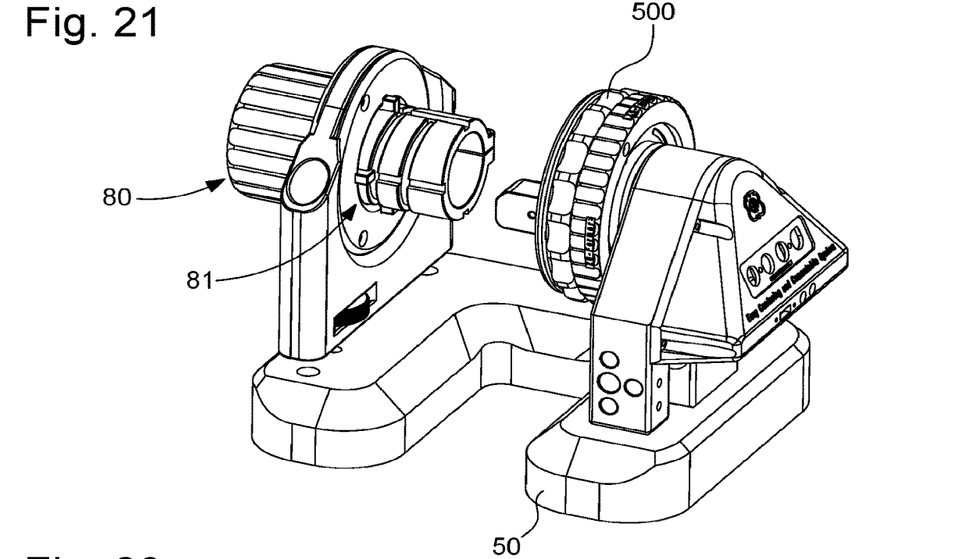
FIG. 21 is a further reverse angle view of the device in FIG. 20.
Figure 22:
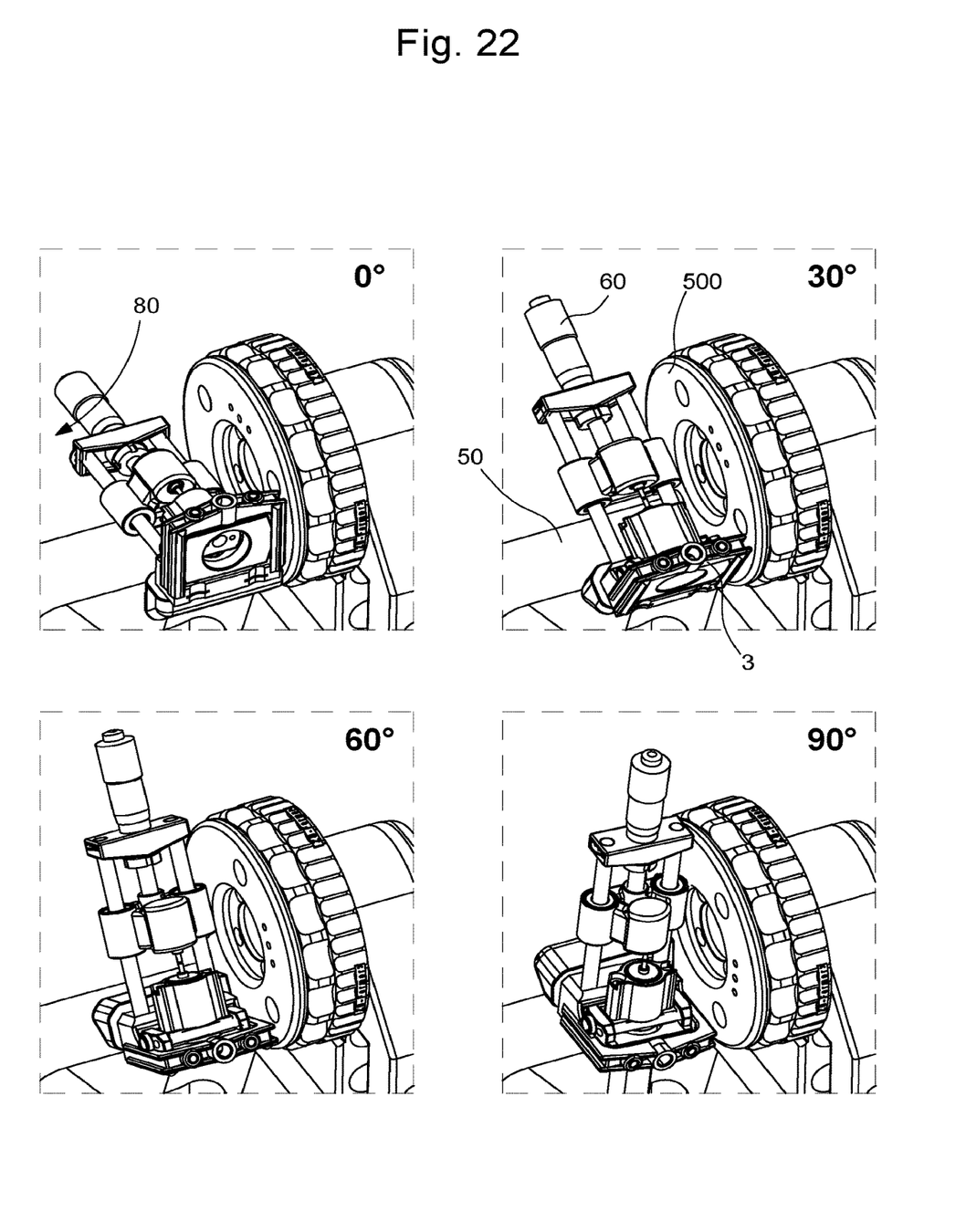
FIG. 22 represents, schematically, in a partial perspective view, the complete device, with the common sole of the headstock and the tailstock of the mechanism of FIG. 1 which is mounted on the rotary plate of FIG. 20, in four different angular positions, corresponding to four different positions of the mobile component to be measured in the gravitational field.

More specifically, as seen in FIGS. 20 and 21, the device 100 includes a main frame 50, which is arranged to directly or indirectly bear the common sole 3, and to bear viewing means 80 arranged to observe and/or measure a horological mobile component held by two interchangeable removable centering devices 5, in the space 90, and the device 100 includes positional setting means 81 of the viewing means 80, such as screw threads or similar.

Advantageously, the main frame 50 is arranged to indirectly bear the common sole 3 via at least one rotary plate 500, optionally motorized, arranged to present a horological mobile component in different positions in the gravitational field.

Figure 23:
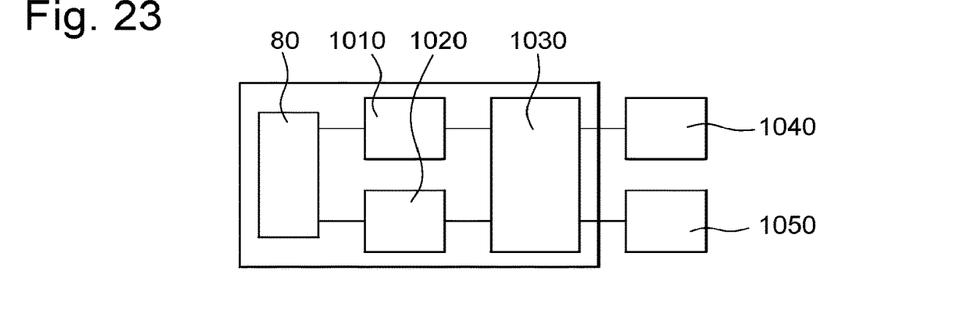
FIG. 23 is a block diagram representing such a device, with means for analyzing images and/or measurements made by the viewing means with respect to set-point values, means for computing deviations, and linking means with an integrated product quality management and/or production management system, for correcting the settings of the production means according to the deviations.

More specifically, the device 100 includes means 1010 for analyzing images and/or measurements made by the viewing means 80 with respect to set-point values, means for computing deviations 1020, and linking means 1030 with an integrated product quality management 1040 and/or production management 1050 system, for correcting the settings of the production means according to the deviations.

In sum, the removable centering devices 5 according to the invention, which are actually micro-centering devices due to the small end dimensions thereof at the level of the mobile component to be inspected, are simple, inexpensive, readily interchangeable, well-suited to various needs, and suitable for use for various, and particularly but non-restrictively optical, measuring means. The magnets included in the headstock and the tailstock carry out two functions:
  magnetically attracting each micro-centering device in the respective spindle, and;
  inducing a magnetic field in the micro-centering devices, which moreover concentrate the magnetic flux in the immediate vicinity of the axis of the mobile component to be inspected.

The invention thus constitutes a microtechnical device for holding and rotating microcomponents between a system consisting of spindle and counter-spindle. Each spindle is constituted such that micro-centering devices can be inserted therein with easy and quick fastening, by an attractive magnetic effect. If the component is ferromagnetic, it will be held by the same magnetic field. If the components are non-magnetic, they can be held between the micro-centering devices of the spindle and the counter-spindle by mechanical centering. The so-called driving spindle includes a dual magnetic effect, while offering perfectly circular rotation of the component. The counter-spindle, for its part, remains, according to the mode of execution thereof, either fixed without rotation, or loose in rotation, or motorized and synchronous with the main spindle. In the context of components that are ferromagnetic and/or not consisting of pivots, specific micro-centering devices easily ensure the hold, alignment and rotation of the component in question.

This device represents an innovation in the field of watchmaking where it represents the only system for holding and rotating microcomponents of any kind and any material, concerned by backlash, locating or dimensional measurements.

Finally, the complete device, as illustrated in FIGS. 20 and 21, is extremely compact (approximately 200 cubic millimeters) and is thus very easy to integrate in a production line. In addition, the accessibility for a robotized manipulator is excellent.

The invention claimed is:

1. A geometric inspection device for horological mobile components, comprising:
  a headstock bearing a first rotatable spindle with a first hole defining a first axis of rotation;
  a tailstock bearing a second spindle defining a second axis of rotation, arranged on a common sole relative to which at least one of the headstock and the tailstock can move according to at least one degree of freedom in translation along alignment guiding means along a common direction parallel with the first axis of rotation; and
  means arranged to at least one of ensure and set the coaxiality of the second axis of rotation relative to the first axis of rotation, wherein
  the second spindle includes a second hole of the same diameter as the first hole,
  the device includes a plurality of removable and interchangeable micro-centering devices,
  each micro-centering device is arranged to be inserted indifferently into one of the first hole and the second hole,
  each micro-centering device includes a peripheral shoulder of a diameter arranged for a tight sliding fit thereof with one of the first hole and the second hole, and
  each micro-centering device includes a ferromagnetic or magnetic polar core arranged to cooperate in attraction with a magnetic pole included in at least one of the headstock and the tailstock and which defines one of a magnetic field of revolution about the first axis of rotation in a space separating the headstock and the tailstock, and a magnetic field formed by the polar core.

2. The device according to claim 1, wherein the tailstock includes elastic return means configured to push the tailstock toward the headstock and to damp recoil of the tailstock, and calibrated at 0.2 N.

3. The device according to claim 1, wherein
at least one micro-centering device forms a cartouche which includes a tubular body, and
the external diameter is arranged for the tight sliding fit thereof with one of the first hole and the second hole, the tubular body containing a ferromagnetic or magnetic polar core.

4. The device according to claim 1, wherein at least one centering device includes means for concentrating an axial magnetic field, to which it is at least one of subjected at a first axial end opposite the space and generated by the at least one centering device, about the common direction, at a second end oriented toward the space.

5. The device according to claim 4, wherein
at least one micro-centering device forms a cartouche which includes a tubular body, and
the external diameter is arranged for the tight sliding fit thereof with one of the first hole and the second hole, the tubular body containing a ferromagnetic or magnetic polar core forming the means for concentrating the axial magnetic field.

6. The device according to claim 1, wherein at least one micro-centering device includes, on the side of the space, a gripper arranged to cooperate by mechanical contact with an axial end of a horological mobile component, and to rotate the axial end when the micro-centering device is subjected to a rotation which is imparted thereon by one of the headstock and the tailstock.

7. The device according to claim 6, wherein the gripper includes a conical bearing toothing, one of male and female, arranged to cooperate with the axial end of a horological mobile component for rotating the mobile component.

8. The device according to claim 6, wherein the gripper includes, at a level of a surface thereof for driving a mobile component, a roughness between 2 micrometers Ra and 5 micrometers Ra.

9. The device according to claim 1, wherein at least one micro-centering device includes, on a side of the space, a ferromagnetic or magnetic polar mass arranged to cooperate in one of magnetic attraction and repulsion with a magnetic or ferromagnetic axial end of a horological mobile component, the polar mass being one of juxtaposed and merged with the polar core.

10. The device according to claim 9, wherein the polar mass is arranged to transmit to a magnetic or ferromagnetic axial end of a horological mobile component a rotational drive torque.

11. The device according to claim 1, wherein at least one micro-centering device includes, on a side of the space, a bearing mass of one of harder material than the horological mobile components to be inspected, and ruby, which is arranged to limit axial travel of an axial end of a horological mobile component.

12. The device according to claim 1, wherein at least the headstock includes first motorization means arranged to rotate the first spindle around the first axis of rotation, and includes between the first motorization means and the first spindle, first coupling means of one of cardan joint and similar type to ensure unrestricted rotation of the first spindle.

13. The device according to claim 12, wherein at least the tailstock includes second motorization means arranged to rotate the second spindle around the second axis of rotation, which can be synchronized with the first motorization means, and includes between the second motorization means and the second spindle, second coupling means of one of cardan joint and similar type to ensure unrestricted rotation of the second spindle.

14. The device according to claim 1, wherein the second spindle is loose in rotation.

15. The device according to claim 1, wherein the device includes at least one of micrometric setting and measurement means of a relative position of the tailstock relative to the headstock along the common direction.

16. The device according to claim 1, wherein the device includes lateral setting means of a position of the second axis of rotation relative to the first axis of rotation.

17. The device according to claim 1, wherein bodies of the headstock, the first spindle, the tailstock, and the second spindle, are made of non-magnetic material so as not to scatter magnetic flux away from the common direction.

18. The device according to claim 1, wherein at least one of the headstock and the tailstock includes at least one stress gauge at least one of for measuring axial force along the common direction and for comparison to a set-point value of the axial force.

19. The device according to claim 1, wherein the device includes a main frame arranged to one of directly and indirectly bear the common sole, and to bear viewing means arranged to at least one of observe and measure a horological mobile component held by two of the centering devices, in the space, and including positional setting means of the viewing means.

20. The device according to claim 19, wherein the main frame is arranged to indirectly bear the common sole via at least one rotary plate arranged to present the horological mobile component in different positions in a gravitational field.

21. The device according to claim 19, wherein the device includes means for analyzing at least one of images and measurements made by the viewing means with respect to set-point values, means for computing deviations, and means for linking with at least one of an integrated product quality management and production management system, for correcting settings of the production means according to the deviations.

* * * * *